April 13, 1937.  F. H. LE JEUNE  2,076,789
WHEEL
Filed Aug. 13, 1934    4 Sheets-Sheet 1
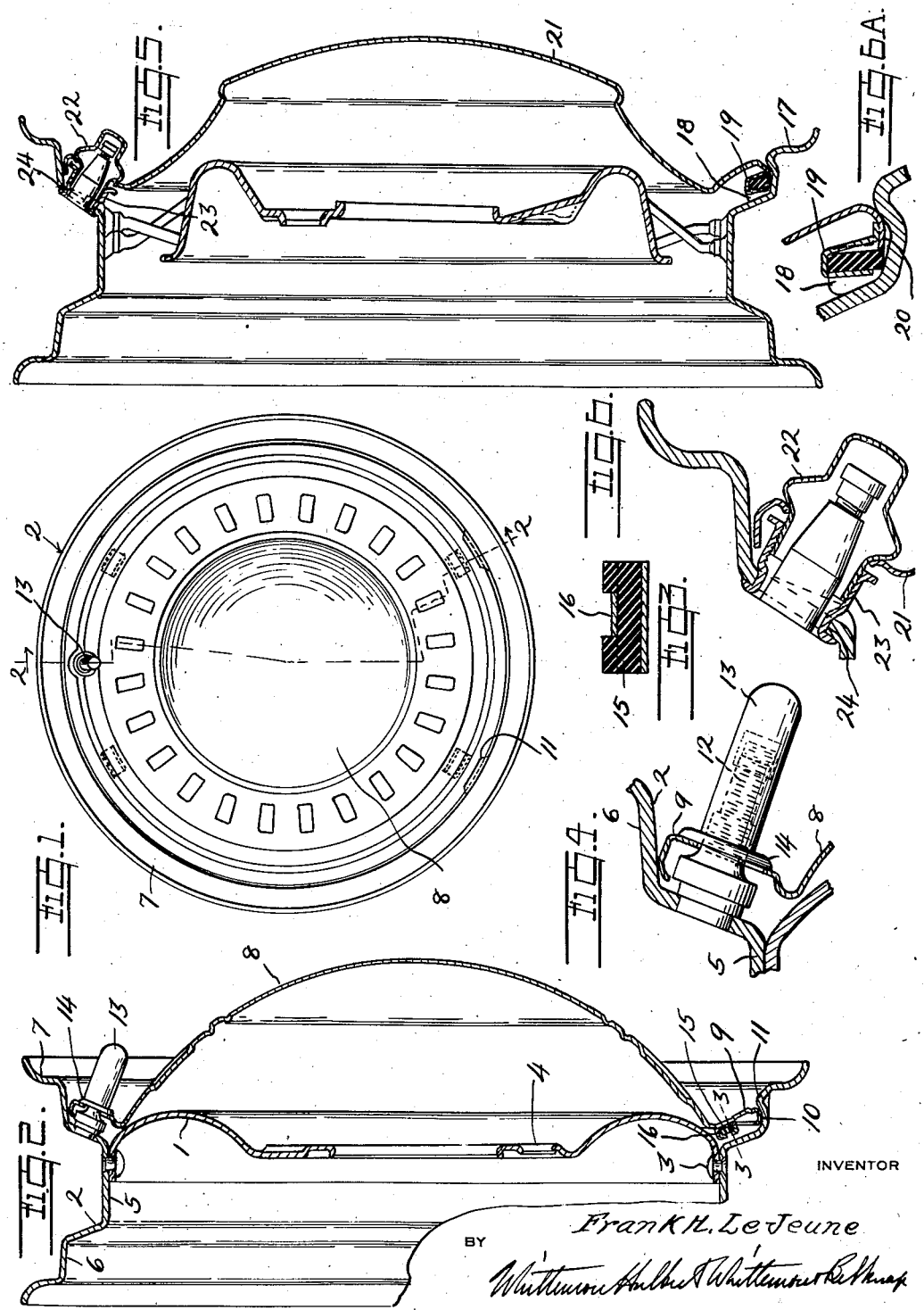
INVENTOR
Frank H. LeJeune
BY
ATTORNEYS

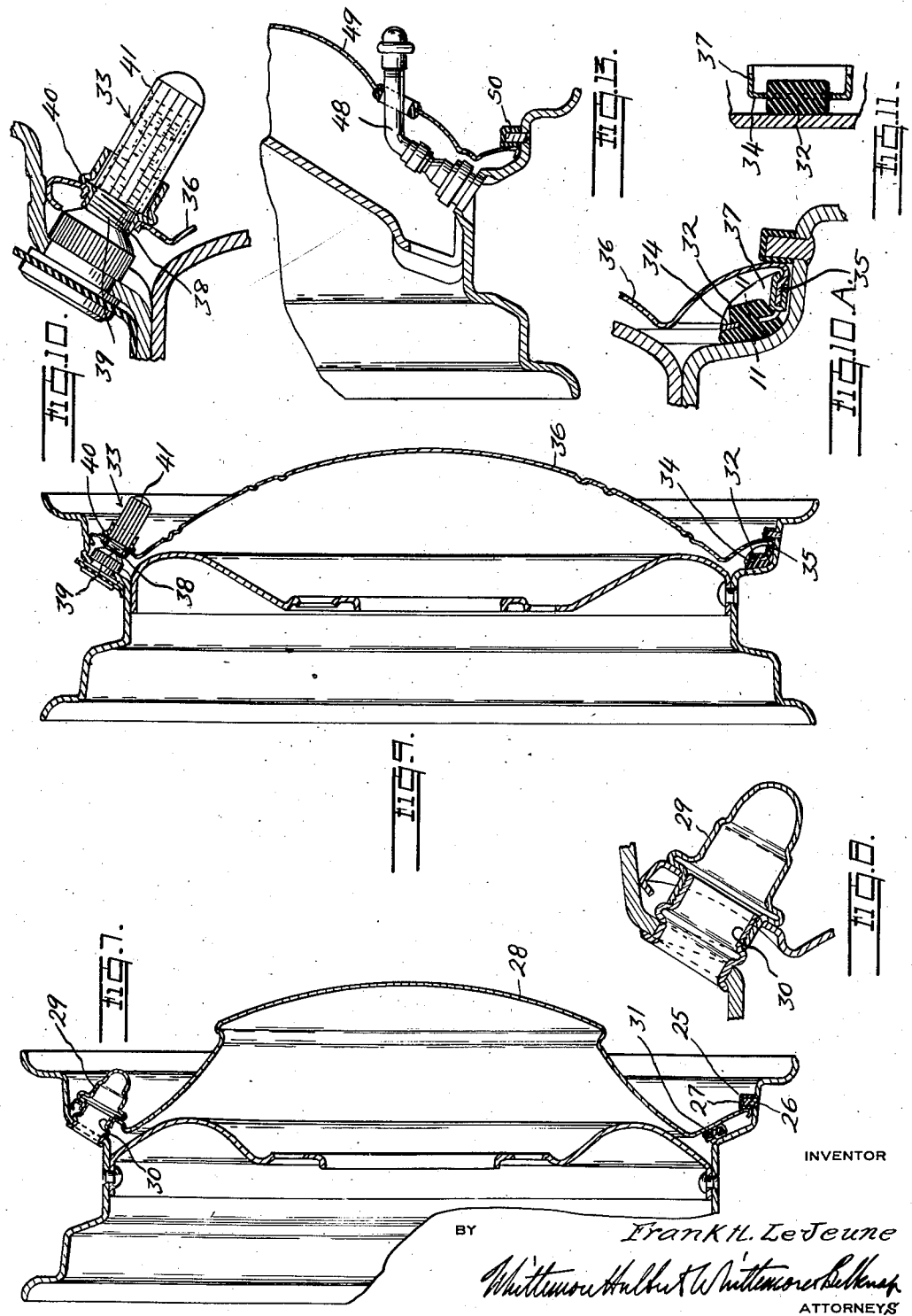

April 13, 1937.  F. H. LE JEUNE  2,076,789
WHEEL
Filed Aug. 13, 1934  4 Sheets-Sheet 3
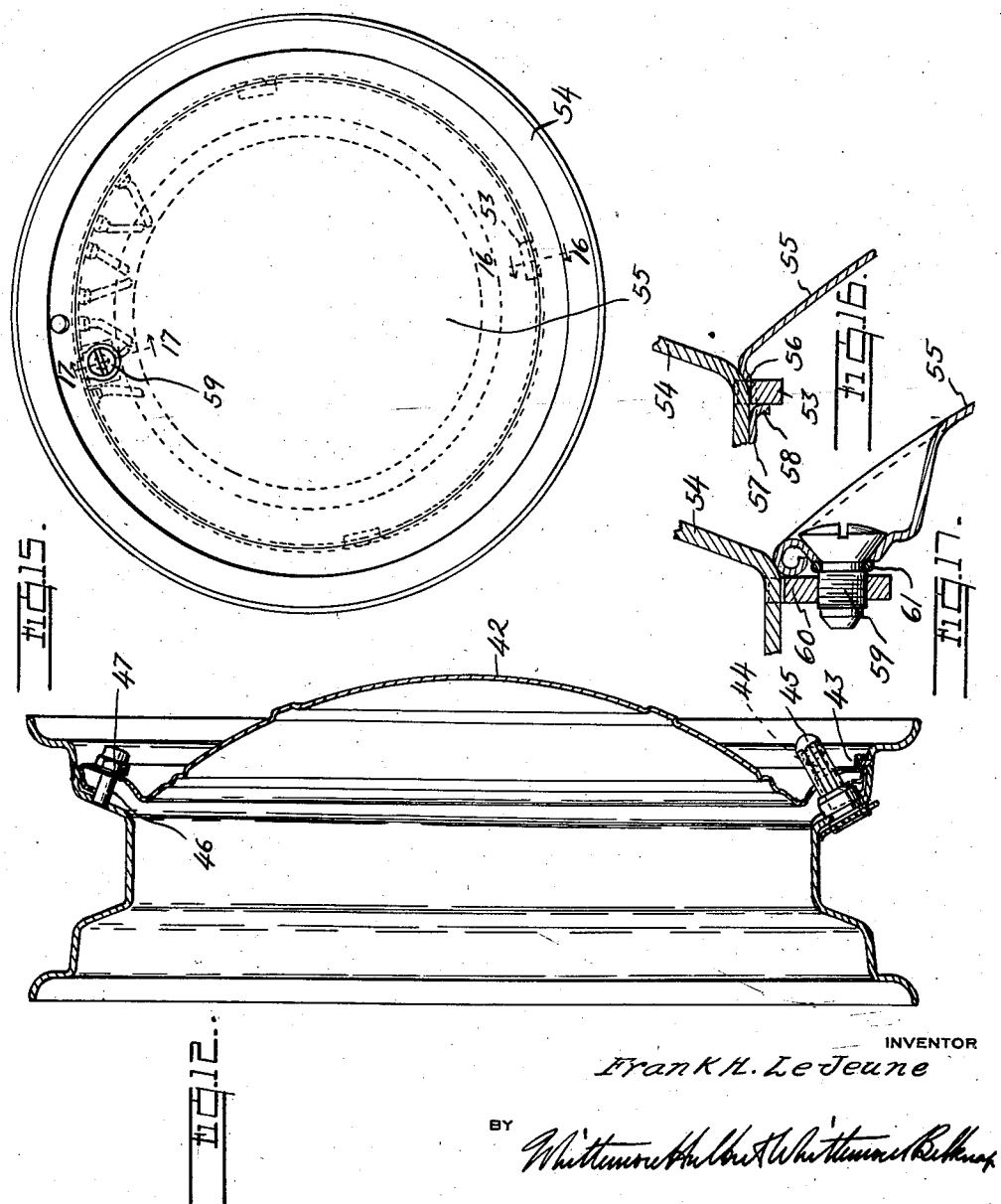
INVENTOR
Frank H. Le Jeune
BY
ATTORNEYS

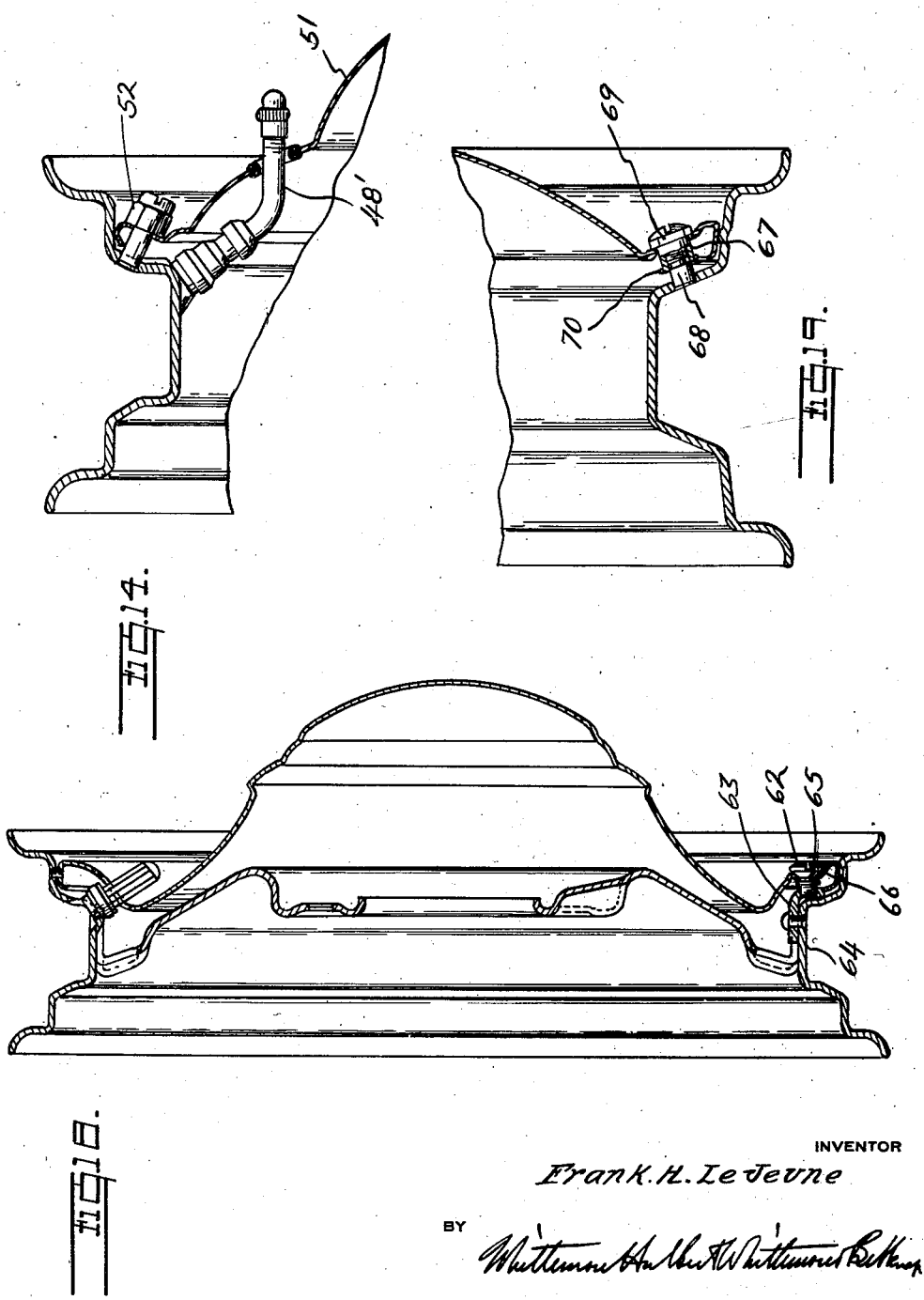

Patented Apr. 13, 1937

2,076,789

UNITED STATES PATENT OFFICE 2,076,789

WHEEL

Frank H. Le Jeune, Detroit, Mich., assignor to Kelsey-Hayes Wheel Company, Detroit, Mich., a corporation of Delaware Application August 13, 1934, Serial No. 739,653

4 Claims. (Cl. 301—37)

The invention relates to wheels and refers more particularly to wheel and cover assemblies. The invention has for one of its objects to provide a wheel and cover assembly which may be manufactured at relatively low cost and in which the cover may be readily applied to or removed from the wheel. Another object is to so mount the cover on the wheel that rattles and squeaks are avoided. Further objects are to provide access to the valve stem from the outboard side of the cover and to provide means associated with the valve stem for securing the cover in place.

These and other objects of the invention will become apparent from the following description, taken in connection with the accompanying drawings, in which Figure 1 is a front elevation of a wheel and a cover assembly showing an embodiment of my invention;

Figure 2 is a cross section on the line 2—2 of Figure 1;

Figure 3 is a cross section on the line 3—3 of Figure 2;

Figure 4 is an enlarged view of a portion of Figure 2;

Figure 5 is a cross sectional view through a vehicle wheel showing another embodiment of my invention;

Figure 6 is an enlarged sectional view of a portion of the construction shown in Figure 5;

Figure 6A is an enlarged section of a portion of Figure 5;

Figure 7 is a cross sectional view of a vehicle wheel illustrating still another embodiment of my invention;

Figure 8 is an enlarged sectional view of a portion of the construction shown in Figure 7;

Figure 9 is a cross sectional view through a vehicle wheel illustrating a further embodiment of my invention;

Figure 10 is an enlarged sectional view of a portion of the construction shown in Figure 9;

Figure 10A is an enlarged section of a portion of Figure 9;

Figure 11 is a cross section on the line 11—11 of Figure 10A;

Figure 12 is a cross sectional view through a vehicle wheel illustrating still a further embodiment of my invention;

Figure 13 is a fragmentary cross sectional view through a vehicle wheel featuring a further embodiment of my invention;

Figure 14 is also a fragmentary cross sectional view of a vehicle wheel showing still another embodiment of my invention;

Figure 15 is a front elevational view of a vehicle wheel showing a further modification of this invention;

Figures 16 and 17 are cross sections on the lines 16—16 and 17—17 respectively of Figure 15;

Figure 18 is a cross sectional view through a vehicle wheel showing still another embodiment of my invention;

Figure 19 is a fragmentary cross sectional view through a vehicle wheel featuring a further embodiment of my invention.

Referring to Figures 1 to 4 inclusive, the wheel has the disk 1 and the rim member 2 which is fixedly secured by suitable means, such as the rivets 3, to the periphery of the disk. The wheel is of the demountable type, the disk having in its central portion the holes 4 for receiving means for detachably securing the disk to the inner hub. The rim member 2 is a rim of the drop-center type for carrying a pneumatic tire, it having the central annular well 5, the lateral annular seats 6 for the tire beads and the annular side flanges 7 for retaining the tire.

8 is the cover which, as shown, is a one-piece stamping arranged to clear and be free of the inner hub. This cover has at its outer edge the annular wall 9 which is located within the annular space between the outer portion of the disk 1 and the outboard seat 6 of the rim. The wall 9 preferably terminates in the peripheral flange 10 which has an external diameter preferably slightly less than the internal diameter of the outboard seat.

For detachably securing the cover to the wheel, I have provided the retainers 11 upon the rim at the side of the axis of the cover opposite the valve stem 12 of the tire. The retainers are arranged symmetrically with respect to the diametrical line passing through the valve stem, which latter extends through the outboard side wall of the well 5. The retainers are depressions formed in the outboard seat 6 of the rim and extending radially inwardly to engage the outboard side of the wall 9 of the cover. I have also provided the valve stem cap 13 which is threaded on to the valve stem 12 and which has the enlarged base 14 for abutting the outboard side of the wall 9 of the cover.

To prevent rattling, I have provided the angularly spaced yieldable bumpers 15 upon the cover and engageable with the rim. These bumpers are preferably formed of rubber and they are fixedly secured to the inboard side of the wall 9 of the cover by the sheet metal clips 16 which substantially encircle the central portions only of the bumpers to permit the end portions to engage the outboard side wall of the well.

To assemble the cover with the wheel, the portion of the cover at the side of its axis opposite the valve stem is inserted behind the retainers, after which the cover is fulcrumed in place, at which time the valve stem passes through the cover, the valve stem cap having been removed. Then the valve stem cap is threaded on to the valve stem and the cover is firmly secured in place, the rubber bumpers functioning to hold the cover against the inboard side of the retainers and out of engagement with the outboard side wall of the rim well and the disk.

In the modification shown in Figures 5 and 6, the wheel is a wire wheel of the demountable type and the rim 17 is formed in the same manner as the rim 2. The rubber bumpers 18, however, instead of being located to engage the outboard side wall of the rim well near its base, engage the outboard side wall near the outboard seat of the rim. These bumpers are secured in place by the sheet metal clips 19, the clips being fixedly secured to the peripheral flange 20 of the cover 21. Instead of the valve stem cap 22 being threaded upon the valve stem, this cap extends into and threadedly engages the sheet metal tubular member 23 which is fixedly secured in the valve stem hole 24 formed in the outboard side wall of the rim well. As shown, the tubular member is riveted in place. The valve stem cap has an annular enlargement for abutting the outboard side of the cover.

Figures 7 and 8 disclose another modification in which the wheel is formed in substantially the same manner as that shown in Figures 1 and 2. However, instead of using a pair of retainers at the side of the axis of the cover opposite the valve stem, but one retainer 25 is used, this being diametrically opposite the valve stem. This retainer is in the nature of the projection 26 riveted to the outboard seat of the rim and the yieldable layer 27 preferably formed of rubber for covering the portion of the projection extending radially inwardly beyond the seat. This rubber layer is engageable with the outboard side of the cover 28 and avoids marring of this cover. The valve stem cap 29, instead of extending into the tubular member 30, encircles the same, the two being adapted to be secured together by threads. Rubber bumpers 31 corresponding to the rubber bumpers 15 yieldably hold the parts from rattling.

In the modification shown in Figures 9, 10 and 11, the essential differences in construction reside in the rubber bumpers 32 and the valve stem cap means 33. The rubber bumpers are located to engage the outboard side of the rim well near the outboard seat and these bumpers are secured by the sheet metal clips 34, the bases of which are secured to the peripheral flange 35 of the cover 36. The clips have the end walls 37 for stiffening their portions to which the rubber bumpers are secured. The valve stem cap means 33 comprises the sheet metal tubular member 38 which is threaded on to the valve stem 39 and which has the enlargement 40 for abutting the cover 36. The valve stem cap means also comprises the valve stem cap 41 which extends freely into the tubular member and which is threaded on to the valve stem. With this arrangement, the valve stem cap may be removed to inflate the tire without loosening the means for securing the cover to the wheel.

Figure 12 discloses another modification in which the cover 42 engages at one side of its axis the inboard side of the retainer 43, the valve stem 44 and its cap 45 being adapted to extend through the cover radially inwardly of the retainer. The cover is secured in place at the opposite side of its axis by the stud 46 which is fixedly secured to the outboard side of the rim well and the nut 47 threaded upon this stud and abutting the cover.

As shown in Figures 13 and 14, the valve stems extend from the rim at the juncture of the outboard side and the base of the rim well and the angular tubular fittings 48 and 48' are secured to these valve stems. The fitting 48 is adapted to extend through the cover 49 radially inwardly of the rubber protected retainer 50, as shown in Figure 13, while the fitting 48' is adapted to extend through the cover 51 radially inwardly of the nut 52 for abutting the outboard side of the cover, as shown in Figure 14.

As shown in Figures 15, 16 and 17, the retainer 53 which is fixedly secured to the rim 54 is concealed by the cover 55 when the latter is in place. This retainer has a radially inwardly extending projection riveted to the rim and adapted to extend through the hole 56 formed in the peripheral flange 57 of the cover. This hole is preferably formed by shearing the metal therefrom and turning the sheared metal radially inwardly to form the tongue 58 which is engageable with the retainer. At the opposite side of the axis of the cover there is the screw 59 which abuts the outboard side of the cover and is threaded into the radially inwardly extending projection 60 riveted to the rim. This screw is preferably permanently secured to the cover by the split ring 61 which is secured in an annular groove in the shank of the screw near its head and which freely abuts the in-board side of the cover.

Figure 18 discloses another modification in which the retainer fixedly secured to the rim is also concealed by the cover, this particular construction being very similar to that shown particularly in Figure 16. At the opposite side of the axis of the cover there is the screw 62 for abutting the outboard side of the cover, this screw threadedly engaging the bracket 63 which is angle shaped and has one flange at the inner side of and riveted to the base 64 of the annular well of the rim. The screw is formed with the V-shaped annular groove 65 which is freely engaged by the frusto-conical depression 66 of the cover whereby the screw and the cover are permanently freely secured together. Rubber bumpers, such as previously described, are also employed in this modification.

The modification shown in Figure 19 differs from that shown in Figure 18 mainly in that the movable retainer for the cover comprises the nut 67 threaded upon the stud 68, which latter is secured to the rim. The nut has the solid enlarged portion 69 for abutting the outboard side of the cover and the spun or flanged portion 70 for abutting the inboard side of the cover, the two cooperating to permanently secure the nut to the cover and at the same time provide for the necessary relative movement of the nut and the cover.

What I claim as my invention is:

1. The combination with a wheel having a tire carrying rim and a cover, of retaining means on said rim and engageable with said cover at one side of its axis, and retaining means encircling the valve stem of the tire and engageable with said cover at the opposite side of its axis.

2. The combination with a wheel having a tire carrying rim and a cover, of retaining means permanently secured to said rim and engageable with said cover at one side of its axis, and retaining means comprising a cap enclosing the valve stem of the tire and engageable with said cover at the opposite side of its axis.

3. The combination with a wheel having a tire carrying rim and a cover, of retaining means on said rim and engageable with said cover at one side of its axis, and retaining means comprising a tubular member on said rim and encircling the valve stem of the tire, and a member engageable with said tubular member and also encircling the valve stem and engageable with said cover at the opposite side of its axis.

4. The combination with a wheel having a tire carrying rim and a cover, of retaining means on said rim and engageable with said cover at one side of its axis and retaining means comprising a tubular member secured to said rim and encircling the valve stem of the tire, and a cap for enclosing the valve stem, said cap detachably engaging said tubular member and having an enlarged portion for abutting said cover.

FRANK H. LE JEUNE.